з,406,225
Patented Oct. 15, 1968

3,406,225
CYCLIC PROSPHORUS ACID ESTERS
Daniel S. Raden, Chicago, Ill., assignor to Velsicol
Chemical Corporation, a corporation of Delaware
No Drawing. Filed Nov. 26, 1965, Ser. No. 510,037
10 Claims. (Cl. 260—953)

This invention relates to new compositions of matter. More particularly, this invention relates to halogen and phosphorous containing polyols useful as intermediates and as an ingredient in flame retardant polyesters and polyurethanes.

The compounds of the present invention have the structure:

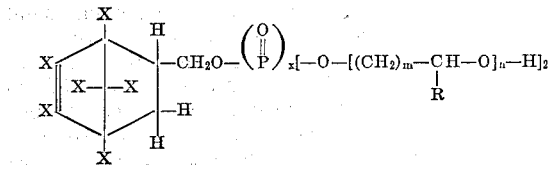

(Structure I)

wherein X is selected from the group consisting of chlorine and bromine; $m$ is an integer from 1 to 2; $n$ is an integer from 0 to 20; $x$ is an integer from 0 to 1; and R is selected from the group consisting of hydrogen and lower alkyl.

Cellular foam compositions have been found to be generally useful as insulation and as support for lightweight metal or plastic structures. The procedure ordinarily followed in the use of such foams is to introduce the unfoamed composition into a cavity such as between thin metal walls and by the application of a foaming agent and/or moderate heating, promote the foaming action of said composition, thus filling the cavity and producing a rigid cellular plastic foam closely bonded to the walls of the cavity.

While conventional foams have been used as above described, they are not entirely satisfactory from several viewpoints. In particular, they are not satisfactory with respect to flame retardance and fire resistance and such properties are desirable and necessary in the production of equipment used in military aircraft, naval aircraft or civilian aircraft where fire is a constant hazard.

Heretofore several chemicals have been used in attempts to eliminate the fire hazard from polyesters, polyurethanes and other plastics. These chemicals usually contain phosphorus, antimony, or halogen and are added to the formulation as additives. However, these additives are often lost from the ultimate product by being washed or leached out of the product. In addition, many of these additives have various adverse effects upon the properties of the ultimate product.

One solution for overcoming the defects in the use of flame retardant additives has been the use of reactive intermediates containing halogen or phosphorus. However, large quantities of these intermediates are often required in the formulation to obtain effective flame retardance and this can restrict the usefulness of the formulation.

Therefore, it is one object of the present invention to provide new halogen and phosphorus containing polyols.

It is another object of the present invention to provide new polyols which can impart inherent and permanent flame retardant properties to polyesters and polyurethanes.

Another object of the present invention is to provide rigid cellular plastic foams which have the desirable properties of conventional foams and in addition have unusually high retardance to flame and resistance to burning.

Still another object of this invention is to provide new polyol ingredients or novel rigid cellular plastic foams having desirable properties, which due to the new ingredients inherently and permanently contain excellent flame retardance and fire resistance which cannot be destroyed by washing or leaching.

These and other objects and advantages of the present invention will be apparent from the following description and examples.

The compounds of the present invention represented by Structure I wherein $n$ is zero, are dihydroxy-phosphates or -phosphites. These compounds can be used as intermediates for making other compounds, such as the polyols of Structure I wherein $n$ is not zero, and the polyether polyols wherein $n$ is greater than 1. The compounds of Structure I wherein $n$ is zero, can be prepared readily by reacting 1,4,5,6,7,7-hexahalo-2-hydroxymethyl-bicyclo [2.2.1]-5-heptene, hereinafter termed the "hydroxymethyl adduct," with a suitable phosphorus oxide or halide. The hydroxymethyl adduct wherein the halogen is chlorine can be prepared as taught in the art. The adduct wherein the halogen is bromine can be prepared readily by reacting hexabromocyclopentadiene with allyl alcohol, such as by mixing the ingredients and heating the mixture at reflux for up to about 24 hours.

Thus, to prepare the compounds having Structure I wherein $x$ and $n$ are zero, the hydroxymethyl adduct is reacted with a trivalent phosphorus compound, such as a phosphorus trihalide, for example, phosphorus trichloride; whereas to prepare the compounds having Structure I wherein $x$ is 1 and $n$ is zero, the hydroxymethyl adduct is reacted with a pentavalent phosphorus compound, such as phosphorus oxychloride, phosphorus oxybromide, phosphorus pentoxide, phosphorus pentachloride, and the like.

More specifically, the compounds of Structure I wherein $n$ is zero, can be prepared by slowly adding the hydroxy-methyl adduct to a solution of the phosphorus reagent in a suitable solvent such as benzene, diethyl ether and the like. A hydrogen chloride scavenger such as pyridine can be used advantageously in this reaction. The reaction mixture is heated, preferably to reflux, if benzene or diethyl ether is used as the solvent. The desired product can be recovered from the reaction mixture by methods common to the art, such as by distilling off the solvent and unreacted phosphorus reagent, extraction or alkalization followed by extraction and acidification, and the like. The product thus obtained is suitable for use as an intermediate in the preparation of other compounds of this invention or it can be further purified for use in this or other applications.

The compounds of the present invention having Structure I wherein $n$ is 1, can be prepared readily by reacting the above intermediate with twice its molecular equivalent of an oxide of the formula

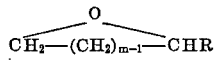

where R and $m$ are as heretofore described. Examples of suitable oxides of this formula wherein $m$ is 1, are ethylene oxide, propylene oxide-1,2 (hereinafter referred to as propylene oxide), butylene oxide-1,2 and the like; whereas propylene oxide-1,3 is exemplary of oxides of this formula wherein $m$ is 2. This reaction is generally self-initiating at room temperature or with gentle heating.

The compounds of the present invention wherein $n$ is greater than 1 in Structure I, can be prepared by reacting twice the molecular equivalent of an oxide of the above formula for each integer that $n$ is greater than 1. Thus, where $n$ is to be 2, two moles of the oxide are reacted per mole of compound wherein $n$ is 1, or 4 moles per mole of compound wherein $n$ is zero; whereas where $n$ is to be 10, 18 moles of the oxide are reacted per mole of the compound wherein $n$ is 1, or 20 moles per mole of compound wherein $n$ is zero.

The reaction of the oxide with the compound of Structure I wherein $n$ is 1 generally can be initiated by use of one of the catalysts generally used for polymerizing the particular oxide involved. Thus where propylene oxide is the oxide, the reaction can be performed in the presence of an acidic or basic catalyst, a complex iron catalyst, and the like. It is preferred to perform this reaction stepwise adding two molecular equivalents of the oxide at each step. The product can be recovered from the reaction mixture by methods common to the art, such as by distilling off the unreacted oxide and any solvent present, by chromatography, extraction, and the like.

The following examples illustrate the preparation of the new compounds of the present invention:

EXAMPLE 1

Preparation of the compound of Structure I wherein X is chlorine, $n$ is zero, and $x$ is one Phosphorus oxychloride (30.8 g.; 0.20 mol), benzene (100 ml.) and pyridine (8 g.; 0.1 mol) were placed into a three-necked, round-bottom flask fitted with a mechanical stirrer, addition funnel and reflux condenser. A solution of 1,4,5,6,7,7-hexachloro-2-hydroxymethyl-bicyclo-[2.2.1]-5-heptene (32.9 g.; 0.1 mol) in benzene (50 ml.) was placed in the addition funnel. The mixture in the flask was stirred and the solution in the addition funnel was added dropwise to the flask over a period of 0.5 hour at room temperature. The reaction mixture was stirred for an additional hour at room temperature and heated to and maintained at reflux for still another hour. After the reaction mixture cooled, the condenser was replaced with a distillation head and the mixture heated under reduced pressure to distill off the excess phosphorus oxychloride and most of the benzene. Water (100 ml.) was added dropwise to the stirred residue and the resulting mixture stirred for an additional hour. The organic and aqueous layers were separated. The aqueous layer was extracted three times with 200 ml. portions of diethyl ether and the combined organic layer and extracts washed three times with 250 ml. portions of water, dried over anhydrous magnesium sulfate, filtered to remove the drying agent and the filtrate heated under reduced pressure to remove the diethyl ether. An infrared analysis on the residual viscous oil showed it to be the desired product, as follows: the absence of a C—OH band at about 2.8 microns, and the presence of a strong P—OH band at 4.4 microns, a vinylic chloride band at 6.2 microns and phosphate bands at 8 and in the 9—10 micron region. There was also some benzene present as shown by the presence of a band at 14.8 microns.

EXAMPLE 2

Preparation of the compound of Structure I wherein X is chlorine, $m$, $n$ and $x$ are each one, and R is methyl The residual oil product of Example I was placed into a 100 ml., three-necked, round-bottom flask fitted with a mechanical stirrer, reflux condenser and an addition funnel. Propylene oxide (50 ml.) was placed into the addition funnel and added dropwise to the vigorously stirred product in the flask. The reaction was initially exothermic and stirring was continued for one hour after the addition was completed. The reflux condenser was replaced with a distillation head and unreacted propylene oxide was removed by heating. The residual oil contained the desired product as shown by infrared analysis as follows: The absence of the P—OH band at 4.4 microns and the presence of a strong C—OH band at 2.8 microns, the vinylic chlorine band at 6.2 microns and phosphate bands at 8 and 9—10 microns. There was also some benzene present as shown by a band at 14.8 microns. This residual oil was distilled in vacuo on a steam bath at about 0.5 mm. Hg pressure to remove traces of solvent, giving a clear, pale yellow, viscous oil which was chromatographed on a column of fuller's earth ("Florex XXS") (3 feet x 2½ inches diameter). The column was eluted first with carbon tetrachloride and then wtih acetone. The acetone eluate was treated twice with charcoal ("Nuchar CN"), dried, and heated under reduced pressure to an end point of 70° C. at 0.5 mm. Hg pressure to remove the acetone. The clear, pale yellow, viscous oil was the desired product having the following—

Elemental analysis as calculated for $C_{14}H_{29}Cl_6P$.— Theoretical: Cl, 40.37%. Found: Cl, 40.09%.

EXAMPLE 3

Preparation of 1,4,5,6,7,7-hexabromo-2-hydroxymethyl-bicyclo[2.2.1]-5-heptene

Hexabromocyclopentadiene (200 g.) was placed in a three-necked, round-bottom flask fitted with a mechanical stirrer and reflux condenser. Allyl alcohol (300 ml.) was added and the mixture was heated at reflux for about 19½ hours. Unreacted allyl alcohol was removed by heating under vacuum. The residue was mixed with heptane and the resulting mixture heated and decanted from undissolved material. On standing an oil was formed which crystallized from the heptane. The crystals were dissolved in carbon tetrachloride and recrystallized by cooling the solution on an ice bath, filtering and drying to obtain the desired product. A portion of the product was recrystallized from heptane and had the following—

Elemental analysis as calculated for $C_8H_6Br_6O$.—Theoretical: C, 16.08%; H, 1.01%; Br, 80.23%. Found: C, 16.43%; H, 1.15%; Br, 79.01%.

EXAMPLE 4

Preparation of the compound of Structure I wherein X is bromine, $n$ is zero and $x$ is one Phosphorus oxychloride (15.4 g.; 0.10 mol) was placed in the flask described in Example 1 and stirred. A solution of pyridine (4 g.; 0.05 mol) in benzene (50 ml.) was added dropwise to the stirred contents of the flask. 1,4,5,6,7,7-hexabromo-2-hydroxymethylbicyclo[2.2.1]-5-heptene (30 g.; 0.05 mol), prepared in Example 3, in benzene (100 ml.) was placed in the addition funnel and added dropwise to the stirred contents of the flask. After the addition was complete and the exothermic reaction subsided, the reaction mixture was heated at reflux for about one hour and then allowed to cool. Water (100 ml.) was added dropwise to the reaction mixture at room temperature and the resulting mixture stirred vigorously for about two hours. This mixture was extracted three times with diethyl ether (250 ml. portions) and the combined extracts washed three times with water (100 ml. portions), dried over anhydrous magnesium sulfate, filtered from the drying agent and concentrated to about 75 ml. by heating. The concentrate was the desired product in solvent as shown by infrared analysis as follows: the absence of a C—OH band below 3 microns and the presence of a P—OH band at 4.3 microns, a vinylic bromine band at 6.4 microns and phosphate bands at 8 and in the 9.4–10 micron region.

EXAMPLE 5

Preparation of the compound of Structure I wherein X is bromine, $m$, $n$ and $x$ are each one and R is methyl The product of Example 4 was placed in the flask described in Example 2 and stirred. Propylene oxide (50 ml.) was added dropwise to the vigorously stirred product in the flask. The exothermic reaction was allowed to proceed, and upon subsiding the stirring was continued for about one hour. The reflux condenser was replaced with a distillation head and unreacted propylene oxide and residual solvents were removed by heating under reduced pressure leaving a dark, tarry residue. The residue was treated with small portions of carbon tetrachloride until the amount of undissolved residue remained constant. The carbon tetrachloride solution was separated by chromatography as described in Example 2 to obtain an acetone eluate containing the desired product as shown by infrared analysis as follows: the absence of a P—OH band at about 4.3 microns and the presence of a C—OH band below 3 microns and the vinylic bromine and phosphate bands described in Example 4. This eluate was heated in vacuo to an end point of 60° C. and 0.4 mm. Hg pressure to remove acetone and leave the desired product as the residue.

EXAMPLE 6

Preparation of the compound of Structure I wherein X is chlorine, $n$ is zero and $x$ is one Phosphorus pentoxide (48.3 g.; 0.34 mol) is mixed ith a mixture of diethyl ether-dioxane (75/25 by volume) (1 liter) and placed into a 3-liter, three-necked, round bottom flask fitted with a mechanical stirrer, addition funnel and reflux condenser. A solution of 1,4,5,6,7,7-hexachloro - 2-hydroxymethyl-bicyclo[2.2.1] - 5-heptene. (225 g.; 0.68 mol) in the minimum amount of the above defined solvent mixture required to form a solution, is added dropwise from the addition funnel to the vigorously stirred mixture in the flask over a period of about one hour. The reaction mixture is heated at reflux until complete solution is obtained. After the reaction mixture cooled, water (12 ml.; 0.68 mol) is added and the mixture stirred for one hour, dried over anhydrous magnesium sulfate, filtered from the drying agent, and the solvent removed by heating in vacuo. The residue is the desired product.

In the manner heretofore described, other compounds within the scope of the present invention can be readily prepared. Presented in the following examples are the essential ingredients required to prepare the indicated named compounds according to the procedure detailed in the foregoing examples:

EXAMPLE 7

1,4,5,6,7,7-hexachloro - 2 - hydroxymethyl - bicyclo-[2.2.1] - 5-heptene+phosphorous trichloride=the compound of Structure I wherein X is chlorine and $n$ and $x$ are both zero.

EXAMPLE 8

The product of Example 7+ethylene oxide=the compound of Structure I wherein X is chlorine, R is methyl, $m$ and $n$ are both one and $x$ is zero.

EXAMPLE 9

The product of Example 1+ethylene oxide=the compound of Structure I wherein X is chlorine, R is hydrogen and $m$, $n$ and $x$ are each 1.

EXAMPLE 10

The product of Example 4+ethylene oxide=the compound of Structure I wherein X is bromine, R is hydrogen and $m$, $n$ and $x$ are each one.

EXAMPLE 11

The product of Example 1+propylene oxide-1,3=the compound of Structure I wherein X is chlorine, R is hydrogen, $m$ is two, and $n$ and $x$ are each one.

EXAMPLE 12

The product of Example 1+butylene oxide-1,2=the compound of Structure I wherein X is chlorine, R is ethyl and $m$, $n$ and $x$ are each one.

EXAMPLE 13

The product of Example 1+propylene oxide (6 times the molecular equivalent)=the compound of Structure I wherein X is chlorine, R is methyl, $m$ and $x$ are each one and $n$ is three.

As heretofore stated, the compounds of the present invention are useful as ingredients in flame retardant polyesters and polyurethanes. Saturated polyesters can be prepared from the polyols of the present invention by reaction with dibasic acids such as adipic acid, succinic acid, sebacic acid, glutaric acid, azelaic acid, and the like; while unsaturated polyesters can be prepared by reaction of the polyols with maleic acid, fumaric acid, phthalic acid and the like. Temperatures of from about 100° to about 200° C. are generally satisfactory for use in preparing the polyesters. Other ingredients such as other polyols can be used to lower the concentration of the compounds of the present invention in the polyesters. Suitable polyols for this purpose are those containing at least 2 carbon atoms and at least 2 hydroxyl groups, such as ethylene glycol, glycerol and 1,2,6-hexanetriol; and ether alcohols, such as diethylene glycol and 2,4-dimethyl-2-hydroxymethyl - 1,5 - pentanediol. Similarly, halogen containing acids and anhydrides or polyols, such as chlorendic acid or anhydride, tetrachlorophthalic acid or anhydride, tetrabormophthalic anhydride, the adduct of hexachlorocyclopentadiene and butenediol, and the like, can be used to increase the proportion of halogen in the polyesters.

Where the polyesters are to be used as an ingredient in a polyurethane foam, it is preferred that the polyesters have a low acid number and a high hydroxyl number. Such a polyester can be prepared from about 20 to about 60 mole percent of the dibasic acids and from about 40 to about 70 percent of the polyols, the latter preferably being a mixture of the compounds of the present invention and other polyols.

For use in preparing rigid flame retardant polyurethane foams, a saturated polyester of a compound of the present invention as described above, preferably prepared with a mixture of a polyol of the present invention and a trihydric or higher polyhydric alcohol, or a mixture of the saturated polyester and a polyether, or a mixture of a compound of the present invention and a highly branched polyether, is reacted with a polyisocyanate. It is preferred that the foam composition contain at least an amount of phosphorus and halogen equal to 1.5% phosphorus, 6% bromine or 12.5% chlorine contributed to the foam by the polyols or polyetherpolyols of the present invention according to one of the following approximate formulas for effective flame-retardant properties:

$$\text{percent P} + \frac{\text{percent } Br}{4} = 1.5$$

$$\text{percent P} + \frac{\text{Percent } Cl}{9} = 1.5$$

wherein the percent phosphorus and the percent bromine or chlorine represents the weight percent of the respective elements in the solids in the foam. The term "solids in the foam" denotes the cellular material exclusive of volatile material entrapped therein such as entrapped foaming agent. The respective percentages of phosphorus and halogen in the polyols will vary with the value of $x$, $m$, $n$ and R in Structure I.

While aliphatic polyisocyanates can be used to prepare foams of the compounds of the present invention, it is preferred to use aromatic polyisocyanates and particularly aromatic di- and triisocyanates. Suitable aromatic polyisocyanates are diphenylmethane diisocyanate, toluene diisocyanate, 1-chlorophenyl-2,4-diisocyanate, 1,5-naphthyl diisocyanate, 1,6-hexamethylene diisocyanate, triphenylmethane triisocyanate, polymethylene-polyphenyl-isocyanate, diphenyl-4,6,4'-triisocyanate, and the like.

The foam composition preferably is comprised of from about 30% to about 70% of polyisocyanate based on the weight of solids in the foam, from about 20 to about 40 parts by weight of a saturated polyester heretofore described, and from about 10 to about 25 parts by weight of a halogenated foaming agent.

The foam composition can be readily prepared using methods generally known to the urethane foam art. One such method is known as the "one-shot" method, while another is called the "pre-polymer" method.

As an improvement in the preparation of the foams it has been found advantageous to add a surfactant to the formulation before foaming. The preferred surfactants are the silicone surfactants, such as finely dispersed silicone oils, especially the dimethyl siloxane type, many of which are commercially available.

As an improvement in the preparation of foams, the reaction of the polyisocyanate and the polyester preferably is performed in the presence of a catalyst. Suitable catalysts are tertiary amine catalysts and tin catalysts, many of which are widely known and are commercially available. Exemplary of these suitable catalysts are N,N,N',N'-tetramethyl butane-1,3-diamine, triethylenediamine, stannous octoate, stannous oleate, dibutyltin dioctoate, dibutyltin dilaurate, and the like. The tin catalysts are more powerful catalysts than the tertiary amine catalysts for the isocyanate-hydroxyl reaction and do not evaporate from the foam, as often occurs with the amine catalysts.

The most preferred catalyst for use in preparing the foams is a mixture of a tertiary amine catalyst and a tin catalyst. It is convenient and effective to utilize a lesser amount of the mixture to catalyze a given foam formulation than when only one type of catalyst is used.

Generally, only catalytic amounts of the catalyst are required, i.e., from less than one percent to about five percent by weight of the reaction mixture. From about 0.2 percent to about 1 percent of catalyst per weight of total reactants has been found generally adequate to catalyze the reaction described herein.

Like conventional foams, the foams of the compositions of the present invention may contain and utilize many of the presently used foaming agents. The preferred foaming agents are inert liquids which boil at the temperatures attained by the exothermic catalytic reaction of isocyanate and hydroxyl. Exemplary of the suitable inert organic liquid foaming agents are the halogenated lower alkanes, particularly, trichloromonofluoromethane.

After pouring from the mixing vessel into a suitable mold, hollow structural part, or the like, and the foam rises and hardens, the curing of the foam is completed by heating at a temperature of from about 100° F. to about 325° F. for from about one-half to about 24 hours to obtain the hard, substantially completely cross-linked foam.

I claim:
1. A compound of the structure

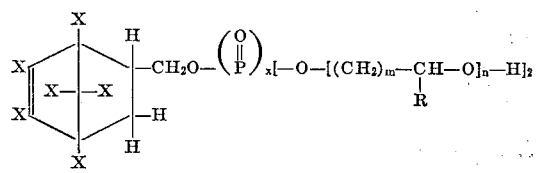

wherein X is selected from the group consisting of chlorine and bromine; $m$ is an integer from 1 to 2; $n$ is an integer from 0 to 20; $x$ is an integer from 0 to 1; and R is selected from the group consisting of hydrogen and lower alkyl.

2. The compound of claim 1 of the formula

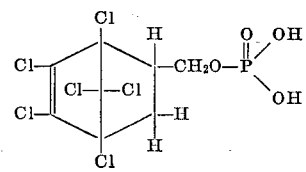

3. The compound of claim 1 of the formula

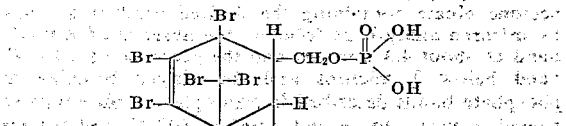

4. The compound of claim 1 of the formula

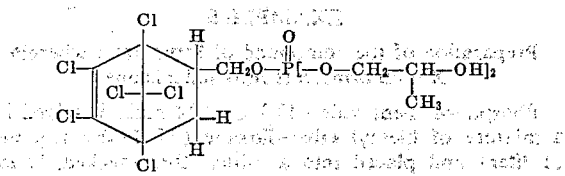

5. The compound of claim 1 of the formula

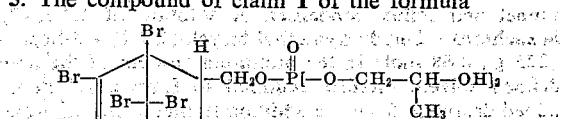

6. The compound of claim 1 of the formula

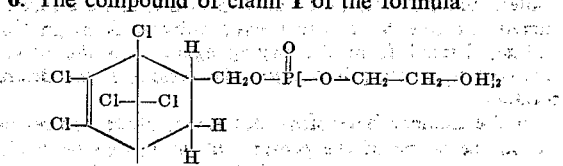

7. The compound of claim 1 of the formula

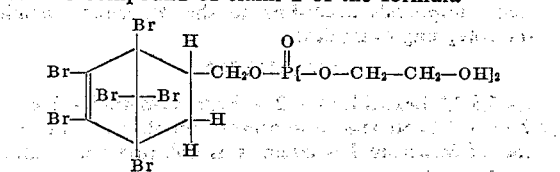

8. The compound of claim 1 of the formula

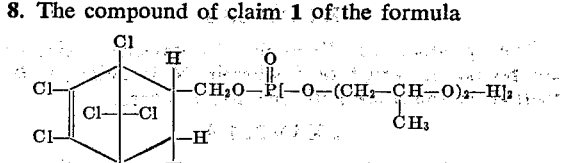

9. The compound of claim 1 of the formula

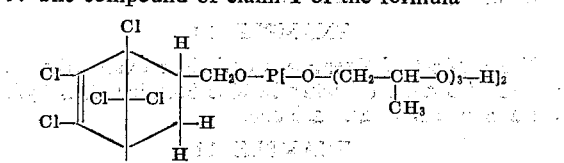

10. The compound of claim 1 of the formula

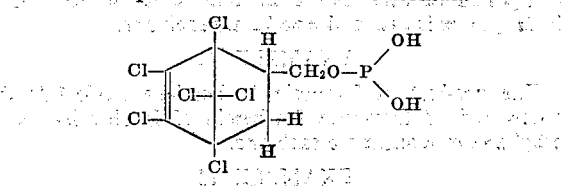

References Cited
UNITED STATES PATENTS
3,318,980   5/1967   Sandri _____ 260—956

CHARLES B. PARKER, *Primary Examiner.*
R. L. RAYMOND, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,246                        October 15, 1968

Arthur P. Davidson et al.

It is certified that error appears in the above identified patent and that said Letters Patent are hereby corrected as shown below:

Column 6, line 16, after "said" insert -- first element body to hold said --.

Signed and sealed this 24th day of February 1970.

(SEAL)
Attest:

Edward M. Fletcher, Jr.                   WILLIAM E. SCHUYLER, JR.
Attesting Officer                             Commissioner of Patents